United States Patent
Matsuyama et al.

(10) Patent No.: US 8,888,610 B2
(45) Date of Patent: Nov. 18, 2014

(54) GOLF BALL

(75) Inventors: Yoshiko Matsuyama, Kobe (JP); Takahiro Sajima, Kobe (JP); Keiji Ohama, Kobe (JP)

(73) Assignee: SRI Sports Limited, Kobe (JP)

( * ) Notice: Subject to any disclaimer, the term of this patent is extended or adjusted under 35 U.S.C. 154(b) by 364 days.

(21) Appl. No.: 13/289,055

(22) Filed: Nov. 4, 2011

(65) Prior Publication Data

US 2012/0165128 A1    Jun. 28, 2012

(30) Foreign Application Priority Data

Dec. 28, 2010 (JP) ................................ 2010-293049

(51) Int. Cl.

| | |
|---|---|
| A63B 37/04 | (2006.01) |
| C08L 75/08 | (2006.01) |
| A63B 37/12 | (2006.01) |
| A63B 37/06 | (2006.01) |
| C08G 18/75 | (2006.01) |
| C08G 18/48 | (2006.01) |
| A63B 37/00 | (2006.01) |

(52) U.S. Cl.
CPC ............. *A63B 37/0003* (2013.01); *C08L 75/08* (2013.01); *A63B 37/0043* (2013.01); *A63B 37/0034* (2013.01); *A63B 37/0031* (2013.01); *A63B 37/0065* (2013.01); *A63B 37/12* (2013.01); *A63B 37/06* (2013.01); *A63B 37/0063* (2013.01); *C08G 18/758* (2013.01); *A63B 37/0076* (2013.01); *C08G 18/4854* (2013.01); *A63B 37/0046* (2013.01)
USPC .......................................... 473/371; 473/376

(58) Field of Classification Search
USPC .................................................. 473/351–378
See application file for complete search history.

(56) References Cited

U.S. PATENT DOCUMENTS

| | | | |
|---|---|---|---|
| 5,725,442 A | 3/1998 | Higuchi et al. | |
| 5,733,205 A | 3/1998 | Higuchi et al. | |
| 6,271,296 B1 | 8/2001 | Nakamura et al. | |
| 6,287,218 B1 * | 9/2001 | Ohama | 473/377 |
| 6,468,169 B1 | 10/2002 | Hayashi et al. | |
| 6,626,770 B2 * | 9/2003 | Takemura et al. | 473/371 |
| 6,705,956 B1 * | 3/2004 | Moriyama et al. | 473/371 |
| 6,855,074 B2 * | 2/2005 | Kato | 473/376 |

(Continued)

FOREIGN PATENT DOCUMENTS

| | | |
|---|---|---|
| JP | 8-336618 A | 12/1996 |
| JP | 9-056848 A | 3/1997 |

(Continued)

*Primary Examiner* — Alvin Hunter
(74) *Attorney, Agent, or Firm* — Birch, Stewart, Kolasch & Birch, LLP

(57) ABSTRACT

A golf ball 2 includes a core 4, a mid layer 6, and a cover 8. The core 4 includes a center 10 and an envelope layer 12. The ratio (Do/De) of an amount of compressive deformation Do of the center 10 to an amount of compressive deformation De of the core 4 is equal to or greater than 1.5 but equal to or less than 2.5. The ratio (Do/Dc) of the amount of compressive deformation Do of the center 10 to an amount of compressive deformation Dc of the golf ball 2 is equal to or greater than 1.8. The diameter of the center 10 is equal to or less than 20 mm. The difference (He−Ho) between a surface hardness He of the core 4 and a central hardness Ho of the center 10 is equal to or less than 40.

17 Claims, 1 Drawing Sheet

(56) References Cited

U.S. PATENT DOCUMENTS

| | | | |
|---|---|---|---|
| 7,614,966 B2 * | 11/2009 | Hirau et al. | 473/376 |
| 7,625,302 B2 * | 12/2009 | Watanabe et al. | 473/376 |
| 8,182,368 B2 * | 5/2012 | Kamino et al. | 473/376 |
| 8,206,245 B2 * | 6/2012 | Kamino et al. | 473/376 |
| 8,262,508 B2 * | 9/2012 | Nakamura et al. | 473/351 |
| 8,292,759 B2 * | 10/2012 | Nakamura et al. | 473/376 |
| 8,366,568 B2 * | 2/2013 | Nakamura et al. | 473/373 |
| 8,501,871 B2 * | 8/2013 | Okabe et al. | 525/179 |
| 8,574,097 B2 * | 11/2013 | Nakamura et al. | 473/358 |
| 8,608,594 B2 * | 12/2013 | Isogawa et al. | 473/376 |
| 2004/0029648 A1 | 2/2004 | Kato | |
| 2009/0042671 A1 | 2/2009 | Ohama | |
| 2010/0093466 A1 | 4/2010 | Ohama et al. | |

FOREIGN PATENT DOCUMENTS

| | | |
|---|---|---|
| JP | 10-328326 A | 12/1998 |
| JP | 2001-017575 A | 1/2001 |
| JP | 2004-130072 A | 4/2004 |
| JP | 2009-39230 A | 2/2009 |
| JP | 2010-88797 A | 4/2010 |

* cited by examiner

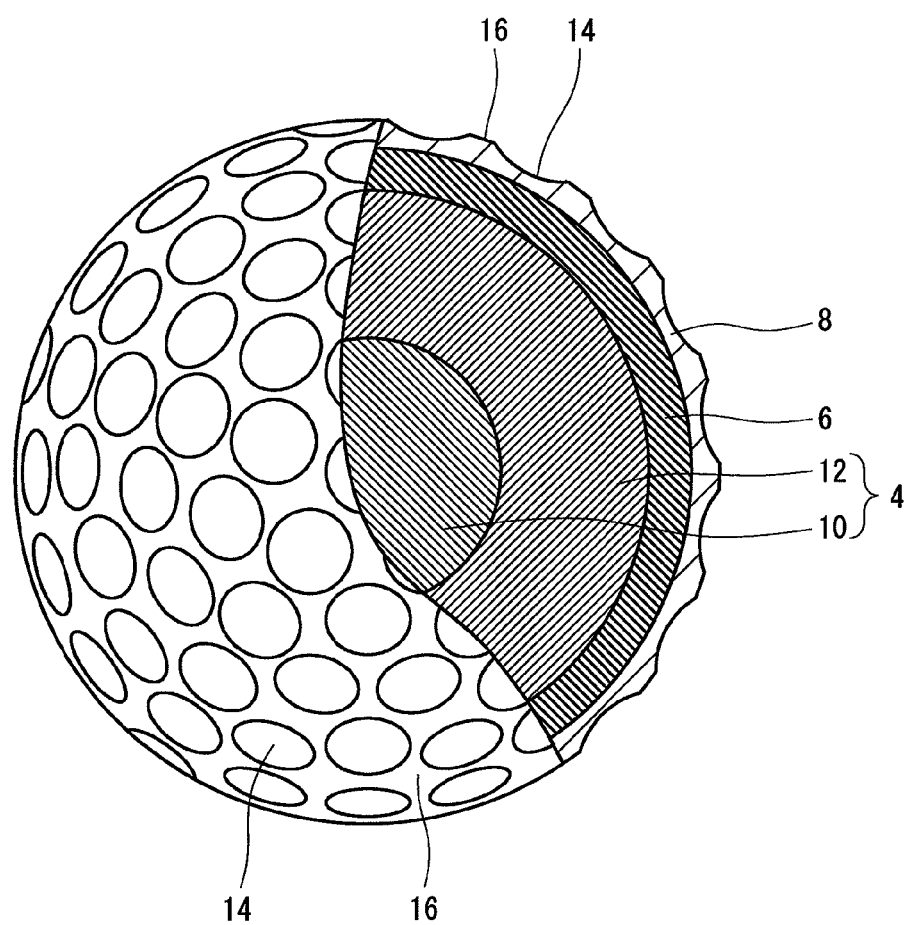

GOLF BALL

This application claims priority on Patent Application No. 2010-293049 filed in JAPAN on Dec. 28, 2010. The entire contents of this Japanese Patent Application are hereby incorporated by reference.

BACKGROUND OF THE INVENTION

1. Field of the Invention

The present invention relates to golf balls. Specifically, the present invention relates to multi-piece golf balls that include a center, an envelope layer, a mid layer, and a cover.

2. Description of the Related Art

Golf players' foremost requirement for golf balls is flight performance. Golf players place importance on flight performance upon shots with a driver, a long iron, and a middle iron. Flight performance correlates with the resilience performance of a golf ball. When a golf ball having excellent resilience performance is hit, the golf ball flies at a high speed, thereby achieving a large flight distance.

An appropriate trajectory height is required in order to achieve a large flight distance. A trajectory height depends on a spin rate and a launch angle. In a golf ball that achieves a high trajectory by a high spin rate, a flight distance is insufficient. In a golf ball that achieves a high trajectory by a high launch angle, a large flight distance is obtained. A core having an outer-hard/inner-soft structure can achieve a low spin rate and a high launch angle.

Golf players also place importance on spin performance of golf balls. When a backspin rate is high, the run is short. It is easy for golf players to cause a golf ball, to which backspin is easily provided, to stop at a target point. When a sidespin rate is high, the golf ball tends to curve. It is easy for golf players to intentionally cause a golf ball, to which sidespin is easily provided, to curve. A golf ball to which spin is easily provided has excellent controllability. In particular, advanced golf players place importance on controllability upon a shot with a short iron.

In light of achieving various performance characteristics, golf balls each having a multilayer structure have been proposed. JPH8-336618 (U.S. Pat. No. 5,733,205) discloses a golf ball that includes a core, an inner cover, and an outer cover. The core consists of an inner sphere and an envelope layer.

JPH9-56848 (U.S. Pat. No. 5,725,442) discloses a golf ball that includes a core, an inner cover, and an outer cover. The core consists of an inner sphere and an envelope layer.

JPH10-328326 (U.S. Pat. No. 6,468,169) discloses a golf ball that includes a core, an envelope layer, an inner cover, and an outer cover.

JP2001-17575 (U.S. Pat. No. 6,271,296) discloses a golf ball that includes a core, an envelope layer, a mid layer, and a cover.

JP2004-130072 (US2004/0029648) discloses a golf ball that includes a core and a cover. The core has a three-layer structure.

Many golf players desire large flight distances upon shots with a long iron and a middle iron. There is room for improvement in the flight performance of golf balls. An object of the present invention is to provide a golf ball with which large flight distances are obtained upon shots with a long iron and a middle iron.

SUMMARY OF THE INVENTION

A golf ball according to the present invention comprises a core, a mid layer positioned outside the core, and a cover positioned outside the mid layer. The core comprises a center and an envelope layer positioned outside the center. A ratio (Do/De) of an amount of compressive deformation Do of the center when a load of 981 N is applied thereto, to an amount of compressive deformation De of the core when a load of 981 N is applied thereto, is equal to or greater than 1.5 but equal to or less than 2.5. A ratio (Do/Dc) of the amount of compressive deformation Do to an amount of compressive deformation Dc of the golf ball when a load of 981 N is applied thereto is equal to or greater than 1.8.

In the golf ball according to the present invention, spin is suppressed upon shots with a long iron and a middle iron. In the golf ball, large flight distances are obtained upon shots with a long iron and a middle iron.

Preferably, a diameter of the center is equal to or less than 20 mm. Preferably, a difference (He−Ho) between a JIS-C hardness He at a surface of the core and a JIS-C hardness Ho at a central point of the center is equal to or less than 40.

Preferably, a JIS-C hardness Hm of the mid layer is equal to or greater than 90. Preferably, a thickness of the mid layer is equal to or less than 1.5 mm. Preferably, a JIS-C hardness Hc of the cover is less than 65. Preferably, a thickness Tc of the cover is less than 0.8 mm.

Preferably, a shear loss elastic modulus G" of a resin composition of the cover, which is measured under conditions of a vibration frequency of 10 Hz and a temperature of 0° C., is equal to or less than $1.95 \times 10^7$ Pa. Preferably, a ratio (E"/G") of a tensile loss elastic modulus E" of the resin composition of the cover, which is measured under conditions of a vibration frequency of 10 Hz and a temperature of 0° C., to the shear loss elastic modulus G" is equal to or greater than 1.76.

The cover can be formed from a resin composition. Preferably, a principal component of a base material of the resin composition is a thermoplastic polyurethane. Preferably, a polyol component of the thermoplastic polyurethane is polytetramethylene ether glycol having a number average molecular weight of 1500 or less.

BRIEF DESCRIPTION OF THE DRAWINGS

FIG. 1 is a partially cutaway cross-sectional view of a golf ball according to one embodiment of the present invention.

DESCRIPTION OF THE PREFERRED EMBODIMENTS

The following will describe in detail the present invention, based on preferred embodiments with reference to the accompanying drawing.

A golf ball 2 shown in FIG. 1 includes a spherical core 4, a mid layer 6 positioned outside the core 4, and a cover 8 positioned outside the mid layer 6. The core 4 includes a spherical center 10 and an envelope layer 12 positioned outside the center 10. On the surface of the cover 8, a large number of dimples 14 are formed. Of the surface of the golf ball 2, a part other than the dimples 14 is a land 16. The golf ball 2 includes a paint layer and a mark layer on the external side of the cover 8 although these layers are not shown in the drawing.

The golf ball 2 has a diameter of preferably 40 mm or greater but 45 mm or less. From the standpoint of conformity to the rules established by the United States Golf Association (USGA), the diameter is particularly preferably equal to or greater than 42.67 mm. In light of suppression of air resistance, the diameter is more preferably equal to or less than 44 mm and particularly preferably equal to or less than 42.80 mm. The golf ball 2 has a weight of 40 g or greater but 50 g or less. In light of attainment of great inertia, the weight is more preferably equal to or greater than 44 g and particularly preferably equal to or greater than 45.00 g. From the standpoint of conformity to the rules established by the USGA, the weight is particularly preferably equal to or less than 45.93 g.

Preferably, the center 10 is obtained by crosslinking a rubber composition. Examples of preferable base rubbers for the rubber composition include polybutadienes, polyisoprenes, styrene-butadiene copolymers, ethylene-propylene-diene copolymers, and natural rubbers. In light of resilience performance, polybutadienes are preferred. When a polybutadiene and another rubber are used in combination, it is preferred if the polybutadiene is included as a principal component. Specifically, the proportion of the polybutadiene to the entire base rubber is preferably equal to or greater than 50% by weight and more preferably equal to or greater than 80% by weight. The proportion of cis-1,4 bonds in the polybutadiene is preferably equal to or greater than 40% and more preferably equal to or greater than 80%.

The rubber composition of the center 10 may include a co-crosslinking agent. The co-crosslinking agent achieves high resilience of the center 10. Examples of preferable co-crosslinking agents in light of resilience performance include monovalent or bivalent metal salts of an $\alpha,\beta$-unsaturated carboxylic acid having 2 to 8 carbon atoms. Specific examples of preferable co-crosslinking agents include zinc acrylate, magnesium acrylate, zinc methacrylate, and magnesium methacrylate. In light of releasability of the center 10 from a mold, magnesium acrylate and magnesium methacrylate are preferred.

The amount of the co-crosslinking agent is preferably equal to or greater than 5 parts by weight but equal to or less than 30 parts by weight, per 100 parts by weight of the base rubber. The golf ball 2 in which the amount is equal to or greater than 5 parts by weight per 100 parts by weight of the base rubber has excellent resilience performance. In this respect, the amount is particularly preferably equal to or greater than 10 parts by weight per 100 parts by weight of the base rubber. The golf ball 2 in which the amount is equal to or less than 30 parts by weight per 100 parts by weight of the base rubber has excellent feel at impact. In the golf ball 2 in which the amount is equal to or less than 30 parts by weight per 100 parts by weight of the base rubber, spin is suppressed upon shots with a long iron and a middle iron. In these respects, the amount is more preferably equal to or less than 25 parts by weight and particularly preferably equal to or less than 20 parts by weight, per 100 parts by weight of the base rubber.

An $\alpha,\beta$-unsaturated carboxylic acid having 2 to 8 carbon atoms and a metal oxide may be included in the rubber composition. They both react with each other in the rubber composition to obtain a salt. The salt serves as a co-crosslinking agent. Examples of preferable $\alpha,\beta$-unsaturated carboxylic acids include acrylic acid and methacrylic acid. Examples of preferable metal oxides include zinc oxide and magnesium oxide. In light of releasability, magnesium oxide is particularly preferred. The amount of the $\alpha,\beta$-unsaturated carboxylic acid is preferably equal to or greater than 15 parts by weight but equal to or less than 45 parts by weight, per 100 parts by weight of the base rubber. The amount of the $\alpha,\beta$-unsaturated carboxylic acid is particularly preferably equal to or greater than 20 parts by weight per 100 parts by weight of the base rubber. The amount of the $\alpha,\beta$-unsaturated carboxylic acid is particularly preferably equal to or less than 40 parts by weight per 100 parts by weight of the base rubber. The amount of the metal oxide is preferably equal to or greater than 20 parts by weight but equal to or less than 50 parts by weight, per 100 parts by weight of the base rubber. The amount of the metal oxide is particularly preferably equal to or greater than 25 parts by weight per 100 parts by weight of the base rubber. The amount of the metal oxide is particularly preferably equal to or less than 45 parts by weight per 100 parts by weight of the base rubber.

Preferably, the rubber composition of the center 10 includes an organic peroxide together with a co-crosslinking agent. The organic peroxide serves as a crosslinking initiator. The organic peroxide contributes to the resilience performance of the golf ball 2. Examples of suitable organic peroxides include dicumyl peroxide, 1,1-bis(t-butylperoxy)-3,3,5-trimethylcyclohexane, 2,5-dimethyl-2,5-di(t-butylperoxy) hexane, and di-t-butyl peroxide. In light of versatility, dicumyl peroxide is preferred.

In light of resilience performance of the golf ball 2, the amount of the organic peroxide is preferably equal to or greater than 0.1 parts by weight, more preferably equal to or greater than 0.2 parts by weight, and particularly preferably equal to or greater than 0.3 parts by weight, per 100 parts by weight of the base rubber. In light of soft feel at impact and in light of suppression of spin upon shots with a long iron and a middle iron, the amount of the organic peroxide is preferably equal to or less than 2.0 parts by weight, more preferably equal to or less than 1.5 parts by weight, and particularly preferably equal to or less than 1.3 parts by weight, per 100 parts by weight of the base rubber.

The rubber composition of the center 10 may include an organic sulfur compound. Examples of preferable organic sulfur compounds include monosubstitutions such as diphenyl disulfide, bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide, bis(4-cyanophenyl)disulfide, and the like; disubstitutions such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl) disulfide, bis(2-cyano-5-bromophenyl)disulfide, and the like; trisubstitutions such as bis(2,4,6-trichlorophenyl)disulfide, bis(2-cyano-4-chloro-6-bromophenyl)disulfide, and the like; tetrasubstitutions such as bis(2,3,5,6-tetrachlorophenyl)disulfide and the like; and pentasubstitutions such as bis(2,3,4,5,6-pentachlorophenyl)disulfide, bis(2,3,4,5,6-pentabromophenyl)disulfide, and the like. The organic sulfur compound contributes to resilience performance. Particularly preferable organic sulfur compounds are diphenyl disulfide and bis(pentabromophenyl)disulfide.

In light of resilience performance of the golf ball 2, the amount of the organic sulfur compound is preferably equal to or greater than 0.1 parts by weight and more preferably equal to or greater than 0.2 parts by weight, per 100 parts by weight of the base rubber. In light of soft feel at impact and in light of suppression of spin upon shots with a long iron and a middle iron, the amount of the organic sulfur compound is preferably equal to or less than 1.5 parts by weight, more preferably equal to or less than 1.0 parts by weight, and particularly preferably equal to or less than 0.8 parts by weight, per 100 parts by weight of the base rubber.

For the purpose of adjusting specific gravity and the like, a filler may be included in the center 10. Examples of suitable fillers include zinc oxide, barium sulfate, calcium carbonate, and magnesium carbonate. The amount of the filler is determined as appropriate so that the intended specific gravity of the center 10 is accomplished. A particularly preferable filler is zinc oxide. Zinc oxide serves not only as a specific gravity adjuster but also as a crosslinking activator.

According to need, an anti-aging agent, a coloring agent, a plasticizer, a dispersant, sulfur, an vulcanization accelerator, and the like are added to the rubber composition of the center 10. Crosslinked rubber powder or synthetic resin powder may also be dispersed in the rubber composition.

In light of durability of the golf ball 2, the center 10 has a central hardness Ho of preferably 40 or greater, more preferably 45 or greater, and particularly preferably 50 or greater. In light of suppression of spin upon shots with a long iron and a middle iron, the central hardness Ho is preferably equal to or less than 80, more preferably equal to or less than 75, and particularly preferably equal to or less than 70. The central hardness Ho is measured by pressing a JIS-C type hardness scale against the central point of a cut plane of the center 10 that has been cut into two halves. For the measurement, an automated rubber hardness measurement machine (trade name "P1", manufactured by Kobunshi Keiki Co., Ltd.), to which this hardness scale is mounted, is used.

The hardness of the center 10 gradually increases from its central point toward its surface. The center 10 has a surface hardness greater than the central hardness Ho.

The center 10 has an amount of compressive deformation Do of preferably 4.0 mm or greater but 7.0 mm or less. The center 10 having an amount of compressive deformation Do of 4.0 mm or greater can achieve excellent feel at impact. The center 10 further suppresses spin upon shots with a long iron and a middle iron. In these respects, the amount of compressive deformation Do is more preferably equal to or greater than 4.5 mm and particularly preferably equal to or greater than 4.9 mm. The center 10 having an amount of compressive deformation Do of 7.0 mm or less can achieve excellent resilience performance. In this respect, the amount of compressive deformation Do is particularly preferably equal to or less than 6.5 mm.

At measurement of an amount of compressive deformation, first, a sphere (the center 10, the core 4, the golf ball 2, or the like) that is to be measured is placed on a hard plate made of metal. Next, a cylinder made of metal gradually descends toward the sphere. The sphere, squeezed between the bottom face of the cylinder and the hard plate, becomes deformed. An amount of deformation of the sphere, starting from the state in which no load is applied to the sphere up to the state in which a load of 981 N is applied thereto, is measured.

The center 10 has a diameter of preferably 10 mm or greater but 20 mm or less. The center 10 having a diameter of 10 mm or greater can achieve excellent feel at impact. In this respect, the diameter is more preferably equal to or greater than 12 mm and particularly preferably equal to or greater than 13 mm. When the center 10 has a diameter of 20 mm or less, the envelope layer 12 having a sufficiently large thickness can be formed. In this respect, the diameter is particularly preferably equal to or less than 18 mm.

The envelope layer 12 is obtained by crosslinking a rubber composition. Examples of base rubbers for the rubber composition include polybutadienes, polyisoprenes, styrene-butadiene copolymers, ethylene-propylene-diene copolymers, and natural rubbers. In light of resilience performance, polybutadienes are preferred. When a polybutadiene and another rubber are used in combination, it is preferred if the polybutadiene is included as a principal component. Specifically, the proportion of the polybutadiene to the entire base rubber is preferably equal to or greater than 50% by weight and more preferably equal to or greater than 80% by weight. The proportion of cis-1,4 bonds in the polybutadiene is preferably equal to or greater than 40% and more preferably equal to or greater than 80%.

In order to crosslink the envelope layer 12, a co-crosslinking agent is preferably used. Examples of preferable co-crosslinking agents in light of resilience performance include monovalent or bivalent metal salts of an α,β-unsaturated carboxylic acid having 2 to 8 carbon atoms. Specific examples of preferable co-crosslinking agents include zinc acrylate, magnesium acrylate, zinc methacrylate, and magnesium methacrylate. In light of resilience performance, zinc acrylate and zinc methacrylate are particularly preferred.

In light of resilience performance of the golf ball 2, the amount of the co-crosslinking agent is preferably equal to or greater than 20 parts by weight, more preferably equal to or greater than 25 parts by weight, and particularly preferably equal to or greater than 30 parts by weight, per 100 parts by weight of the base rubber. In light of soft feel at impact, the amount of the co-crosslinking agent is preferably equal to or less than 50 parts by weight, more preferably equal to or less than 45 parts by weight, and particularly preferably equal to or less than 40 parts by weight, per 100 parts by weight of the base rubber.

Preferably, the rubber composition of the envelope layer 12 includes an organic peroxide together with a co-crosslinking agent. The organic peroxide serves as a crosslinking initiator. The organic peroxide contributes to the resilience performance of the golf ball 2. Examples of suitable organic peroxides include dicumyl peroxide, 1,1-bis(t-butylperoxy)-3,3,5-trimethylcyclohexane, 2,5-dimethyl-2,5-di(t-butylperoxy)hexane, and di-t-butyl peroxide. In light of versatility, dicumyl peroxide is preferred.

In light of resilience performance of the golf ball 2, the amount of the organic peroxide is preferably equal to or greater than 0.1 parts by weight, more preferably equal to or greater than 0.3 parts by weight, and particularly preferably equal to or greater than 0.5 parts by weight, per 100 parts by weight of the base rubber. In light of soft feel at impact, the amount of the organic peroxide is preferably equal to or less than 2.0 parts by weight, more preferably equal to or less than 1.5 parts by weight, and particularly preferably equal to or less than 1.0 parts by weight, per 100 parts by weight of the base rubber.

Preferably, the rubber composition of the envelope layer 12 includes an organic sulfur compound. The organic sulfur compounds described above for the center 10 can be used for the envelope layer 12. In light of resilience performance of the golf ball 2, the amount of the organic sulfur compound is preferably equal to or greater than 0.1 parts by weight and more preferably equal to or greater than 0.2 parts by weight, per 100 parts by weight of the base rubber. In light of soft feel at impact, the amount of the organic sulfur compound is preferably equal to or less than 1.5 parts by weight, more preferably equal to or less than 1.0 parts by weight, and particularly preferably equal to or less than 0.8 parts by weight, per 100 parts by weight of the base rubber.

The golf ball 2 may include a core 4 in which the rubber composition of the center 10 does not include an organic sulfur compound and the rubber composition of the envelope layer 12 includes an organic sulfur compound. In the core 4, an appropriate hardness distribution can be obtained.

For the purpose of adjusting specific gravity and the like, a filler may be included in the envelope layer 12. Examples of suitable fillers include zinc oxide, barium sulfate, calcium carbonate, and magnesium carbonate. Powder of a metal having a high specific gravity may be included as a filler. Specific examples of metals having a high specific gravity include tungsten and molybdenum. The amount of the filler is determined as appropriate so that the intended specific gravity of the envelope layer 12 is accomplished. A particularly preferable filler is zinc oxide. Zinc oxide serves not only as a specific gravity adjuster but also as a crosslinking activator. According to need, various additives such as sulfur, an antiaging agent, a coloring agent, a plasticizer, a dispersant, and the like are included in the envelope layer 12 in an adequate amount. Crosslinked rubber powder or synthetic resin powder may also be included in the envelope layer 12.

During formation of the envelope layer 12, the center 10 is covered with two uncrosslinked or semi-crosslinked half shells. These half shells are compressed and heated. By this heating, a crosslinking reaction takes place to complete the envelope layer 12. The crosslinking temperature is generally equal to or higher than 140° C. but equal to or lower than 180° C. The time period for crosslinking the envelope layer 12 is generally equal to or longer than 10 minutes but equal to or shorter than 60 minutes.

The hardness of the envelope layer 12 gradually increases from its innermost portion to its surface. In light of resilience performance, a hardness He at the surface of the envelope layer 12 (namely, the surface of the core 4) is preferably equal to or greater than 75, more preferably equal to or greater than 80, and particularly preferably equal to or greater than 85. In light of feel at impact, the hardness He is preferably equal to or less than 95, more preferably equal to or less than 93, and particularly preferably equal to or less than 92. The hardness He is measured by pressing a JIS-C type hardness scale against the surface of the core 4. For the measurement, an automated rubber hardness measurement machine (trade name "P1", manufactured by Kobunshi Keiki Co., Ltd.), to which this hardness scale is mounted, is used.

The envelope layer 12 has a thickness of preferably 8 mm or greater but 18 mm or less. The envelope layer 12 having a thickness of 8 mm or greater can suppress spin. In this respect, the thickness is more preferably equal to or greater than 9 mm and particularly preferably equal to or greater than 10 mm. When the envelope layer 12 has a thickness of 18 mm or less, the center 10 having a large diameter can be formed. The center 10 having a large diameter can suppress spin upon a shot with a middle iron. In this respect, the thickness is more preferably equal to or less than 16 mm and particularly preferably equal to or less than 15 mm.

The ratio of the volume of the core 4 to the volume of a phantom sphere of the golf ball 2 is preferably equal to or greater than 78%. The core 4 is large. The core 4 can achieve excellent resilience performance of the golf ball 2. The core 4 can suppress spin of the golf ball 2. In these respects, the ratio is more preferably equal to or greater than 79% and particularly preferably equal to or greater than 80%. The surface of the phantom sphere is the surface of the golf ball 2 when it is postulated that no dimple 14 exists.

The core 4 has an amount of compressive deformation De of preferably 2.0 mm or greater but 3.5 mm or less. The core 4 having an amount of compressive deformation De of 2.0 mm or greater can achieve excellent feel at impact of the golf ball 2. In this respect, the amount of compressive deformation De is more preferably equal to or greater than 2.2 mm and particularly preferably equal to or greater than 2.4 mm. The core 4 having an amount of compressive deformation De of 3.5 mm or less can achieve excellent resilience performance of the golf ball 2. In this respect, the amount of compressive deformation De is more preferably equal to or less than 3.2 mm and particularly preferably equal to or less than 2.9 mm.

In light of suppression of spin, the difference (He−Ho) between the surface hardness He of the core 4 and the central hardness Ho of the center 10 is preferably equal to or greater than 20 and particularly preferably equal to or greater than 25. In light of ease of production and in light of resilience performance of the core 4, the difference (He−Ho) is preferably equal to or less than 40 and particularly preferably equal to or less than 35.

The ratio (Do/De) of the amount of compressive deformation Do of the center 10 to the amount of compressive deformation De of the core 4 is preferably equal to or greater than 1.5 but equal to or less than 2.5. When the golf ball 2 in which the ratio (Do/De) is equal to or greater than 1.5 is hit with a driver, a long iron, or a middle iron, spin can be suppressed. In this respect, the ratio (Do/De) is more preferably equal to or greater than 1.7 and particularly preferably equal to or greater than 1.8. In light of durability of the golf ball 2, the ratio (Do/De) is particularly preferably equal to or less than 2.4.

A resin composition is suitably used for the mid layer 6. Examples of the base polymer of the resin composition include ionomer resins, polystyrenes, polyesters, polyamide elastomers, and polyolefins.

Particularly preferable base polymers are ionomer resins. Ionomer resins are highly elastic. As described later, the cover 8 of the golf ball 2 is thin and flexible. Thus, when the golf ball 2 is hit with a driver, a long iron, or a middle iron, the mid layer 6 significantly deforms. The mid layer 6 including an ionomer resin contributes to resilience performance upon shots with a driver, a long iron, and a middle iron. An ionomer resin and another resin may be used in combination. In this case, in light of resilience performance, the proportion of the ionomer resin to the entire base polymer is preferably equal to or greater than 50% by weight, more preferably equal to or greater than 70% by weight, and particularly preferably equal to or greater than 85% by weight.

Examples of preferable ionomer resins include binary copolymers formed with an α-olefin and an α,β-unsaturated carboxylic acid having 3 to 8 carbon atoms. A preferable binary copolymer includes 80% by weight or more but 90% by weight or less of an α-olefin, and 10% by weight or more but 20% by weight or less of an α,β-unsaturated carboxylic acid. The binary copolymer has excellent resilience performance. Examples of other preferable ionomer resins include ternary copolymers formed with: an α-olefin; an α,β-unsaturated carboxylic acid having 3 to 8 carbon atoms; and an α,β-unsaturated carboxylate ester having 2 to 22 carbon atoms. A preferable ternary copolymer includes 70% by weight or more but 85% by weight or less of an α-olefin, 5% by weight or more but 30% by weight or less of an α,β-unsaturated carboxylic acid, and 1% by weight or more but 25% by weight or less of an α,β-unsaturated carboxylate ester. The ternary copolymer has excellent resilience performance. For the binary copolymer and the ternary copolymer, preferable α-olefins are ethylene and propylene, while preferable α,β-unsaturated carboxylic acids are acrylic acid and methacrylic acid. A particularly preferable ionomer resin is a copolymer formed with ethylene and acrylic acid or methacrylic acid.

In the binary copolymer and the ternary copolymer, some of the carboxyl groups are neutralized with metal ions. Examples of metal ions for use in neutralization include sodium ion, potassium ion, lithium ion, zinc ion, calcium ion, magnesium ion, aluminum ion, and neodymium ion. The neutralization may be carried out with two or more types of metal ions. Particularly suitable metal ions in light of resilience performance and durability of the golf ball 2 are sodium ion, zinc ion, lithium ion, and magnesium ion.

Specific examples of ionomer resins include trade names "Himilan1555", "Himilan1557", "Himilan1605", "Himilan1706", "Himilan 1707", "Himilan 1856", "Himilan 1855", "Himilan AM7311", "HimilanAM7315", "HimilanAM7317", "HimilanAM7318", "Himilan AM7320", "Himilan AM7329", and "Himilan AM7337", manufactured by Du Pont-MITSUI POLYCHEMICALS Co., Ltd.; trade names "Surlyn 6120", "Surlyn 6910", "Surlyn 7930", "Surlyn 7940", "Surlyn 8140", "Surlyn 8150", "Surlyn 8940", "Surlyn 8945", "Surlyn 9120", "Surlyn 9150", "Surlyn 9910", "Surlyn 9945", "SurlynAD8546", "HPF1000", and "HPF2000", manufactured by E.I. du Pont de Nemours and Company; and trade names "IOTEK 7010", "IOTEK 7030", "IOTEK 7510", "IOTEK 7520", "IOTEK 8000", and "IOTEK 8030", manufactured by ExxonMobil Chemical Corporation.

Two or more ionomer resins may be used in combination for the mid layer 6. An ionomer resin neutralized with a monovalent metal ion, and an ionomer resin neutralized with a bivalent metal ion may be used in combination.

The mid layer 6 may include a highly elastic resin. Examples of highly elastic resins include polybutylene terephthalate, polyphenylene ether, polyethylene terephthalate, polysulfone, polyethersulfone, polyphenylene sulfide, polyarylate, polyamide imide, polyetherimide, polyether ether ketone, polyimide, polytetrafluoroethylene, polyamino bismaleimide, polybisamide triazole, polyphenylene oxide, polyacetal, polycarbonate, acrylonitrile-butadiene-styrene copolymers, and acrylonitrile-styrene copolymers.

According to need, a coloring agent such as titanium dioxide, a filler such as barium sulfate, a dispersant, an antioxidant, an ultraviolet absorber, a light stabilizer, a fluorescent material, a fluorescent brightener, and the like are included in the mid layer 6 in an adequate amount. For forming the mid layer 6, known methods such as injection molding, compression molding, and the like can be used.

The mid layer 6 has a hardness Hm of preferably 90 or greater. The mid layer 6 having a hardness Hm of 90 or greater achieves excellent resilience performance of the golf ball 2. The mid layer 6 having a hardness Hm of 90 or greater can achieve an outer-hard/inner-soft structure of the sphere consisting of the core 4 and the mid layer 6. The sphere having the outer-hard/inner-soft structure suppresses spin when the golf ball 2 is hit with a driver, a long iron, or a middle iron. In these respects, the hardness Hm is particularly preferably equal to or greater than 92. In light of feel at impact and durability, the hardness Hm is preferably equal to or less than 98 and particularly preferably equal to or less than 97. In light of suppression of spin, preferably, the hardness Hm of the mid layer 6 is greater than the surface hardness He of the core 4, and the surface hardness He of the core 4 is greater than the surface hardness of the center 10.

The hardness Hm is measured with a JIS-C type spring hardness scale mounted to an automated rubber hardness measurement machine (trade name "P1", manufactured by Kobunshi Keiki Co., Ltd.). For the measurement, a slab formed by hot press and having a thickness of about 2 mm is used. A slab kept at 23° C. for two weeks is used for the measurement. At the measurement, three slabs are stacked. A slab formed from a resin composition that is the same as the resin composition of the mid layer 6 is used for the measurement.

In light of suppression of spin, the mid layer 6 has a thickness of preferably 0.3 mm or greater and particularly preferably 0.5 mm or greater. In light of feel at impact, the thickness is preferably equal to or less than 1.5 mm and particularly preferably equal to or less than 1.2 mm.

In light of feel at impact, the sphere consisting of the core 4 and the mid layer 6 has an amount of compressive deformation Dm of preferably 2.35 mm or greater and particularly preferably 2.40 mm or greater. In light of durability, the amount of compressive deformation Dm is preferably equal to or less than 2.80 mm and particularly preferably equal to or less than 2.60 mm.

The cover 8 is formed from a resin composition. Examples of the base polymer of the resin composition include polyurethanes, polyesters, polyamides, polyolefins, polystyrenes, and ionomer resins. Particularly, polyurethanes are preferred. Polyurethanes are flexible. When the golf ball 2 that includes the cover 8 including a polyurethane is hit with a short iron, the spin rate is high. The cover 8 formed from a polyurethane contributes to the controllability upon a shot with a short iron. The polyurethane also contributes to the scuff resistance of the cover 8.

When the golf ball 2 is hit with a driver, a long iron, or a middle iron, the sphere consisting of the core 4 and the mid layer 6 becomes significantly distorted since the head speed is high. Since this sphere has an outer-hard/inner-soft structure, the spin rate is suppressed. The suppression of the spin rate achieves a large flight distance. When the golf ball 2 is hit with a short iron, this sphere becomes less distorted since the head speed is low. When the golf ball 2 is hit with a short iron, the behavior of the golf ball 2 mainly depends on the cover 8. Since the cover 8 including the polyurethane is flexible, a high spin rate is obtained. The high spin rate achieves excellent controllability. In the golf ball 2, both desired flight performance upon shots with a driver, a long iron, and a middle iron and desired controllability upon a shot with a short iron are achieved.

When the golf ball 2 is hit, the cover 8 including the polyurethane absorbs the shock. This absorption achieves soft feel at impact. Particularly, when the golf ball 2 is hit with a short iron or a putter, the cover 8 achieves excellent feel at impact.

When being hit, compressive stress is applied to the cover 8 due to movement of the head of a golf club. Since the face of the golf club has a loft angle, shear stress is also applied to the cover 8 when being hit. The head speed of a short iron is low, and the loft angle of a short iron is high. Thus, when the golf ball 2 is hit with a short iron, the shear stress greatly influences the deformation behavior of the cover 8. The head speeds of a driver, a long iron, and a middle iron are high, and the loft angles of a driver, a long iron, and a middle iron are low. Thus, when the golf ball 2 is hit with a driver, a long iron, or a middle iron, the compressive stress greatly influences the deformation behavior of the cover 8.

The cover 8 has a shear loss elastic modulus $G"$ of preferably $1.95 \times 10^7$ Pa or less. As described above, when being hit with a short iron, the deformation behavior of the cover 8 is greatly influenced by the shear stress. The spin rate obtained when being hit with a short iron correlates with the shear loss elastic modulus $G"$. When the golf ball 2 that includes the cover 8 having a shear loss elastic modulus $G"$ of $1.95 \times 10^7$ Pa or less is hit with a short iron, the spin rate is high. The cover 8 can achieve excellent controllability. In this respect, the shear loss elastic modulus $G"$ is particularly equal to or less than $1.83 \times 10^7$ Pa. In light of ease of forming the cover 8, the shear loss elastic modulus $G"$ is preferably equal to or greater than $1.00 \times 10^6$ Pa and particularly equal to or greater than $1.10 \times 10^6$ Pa.

The ratio ($E"/G"$) of a tensile loss elastic modulus $E"$ of the cover 8 to the shear loss elastic modulus $G"$ is preferably equal to or greater than 1.76. As described above, upon shots with a driver, a long iron, and a middle iron, the deformation behavior of the cover 8 is greatly influenced by the compressive stress. The spin rates obtained upon shots with a driver, a long iron, and a middle iron correlate with the tensile loss elastic modulus $E"$. When the golf ball 2 that includes the cover 8 having a ratio (E"/G") of 1.76 or greater is hit with a driver, a long iron, or a middle iron, the spin rate is low, and when the golf ball 2 is hit with a short iron, the spin rate is high. In this respect, the ratio (E"/G") is more preferably equal to or greater than 1.86 and particularly preferably equal to or greater than 1.90. In light of ease of forming the cover 8, the ratio (E"/G") is preferably equal to or less than 6.0 and particularly preferably equal to or less than 5.5.

The tensile loss elastic modulus E" is preferably equal to or greater than $2.00 \times 10^7$ Pa, more preferably equal to or greater than $2.20 \times 10^7$ Pa, and particularly preferably equal to or greater than $2.40 \times 10^7$ Pa. The tensile loss elastic modulus E" is preferably equal to or less than $1.00 \times 10^8$ Pa.

The shear loss elastic modulus G" and the tensile loss elastic modulus E" can be controlled by adjusting the molecular weight of a polyol, the molecular weight of a polyisocyanate, a ratio (NCO/OH), and the like.

For measuring the shear loss elastic modulus G", a sheet having a thickness of 2 mm is obtained by press molding from a resin composition that is the same as the resin composition of the cover 8. A test piece having a width of 10 mm and an inter-clamp distance of 10 mm is punched out from the sheet. The shear loss elastic modulus G" is measured for the test piece. The measurement conditions are as follows.

Apparatus: "Rheometer ARES", manufactured by TA instruments
Measurement mode: twisting (shearing)
Measurement temperature: 0° C.
Vibration frequency: 10 Hz
Measurement distortion: 0.1%

For measuring the tensile loss elastic modulus E", a sheet having a thickness of 2 mm is obtained by press molding from a resin composition that is the same as the resin composition of the cover 8. A test piece having a width of 4 mm and an inter-clamp distance of 20 mm is punched out from the sheet. The tensile loss elastic modulus E" is measured for the test piece. The measurement conditions are as follows.

Apparatus: the dynamic viscoelasticity measuring apparatus "Rheogel-E4000", manufactured by UBM
Measurement mode: pulling
Measurement temperature: 0° C.
Vibration frequency: 10 Hz
Measurement distortion: 0.1%

A time for which the golf ball 2 and a club contact each other is several hundred microseconds. Thus, the frequency of deformation of the golf ball 2 when being hit is several thousand Hz. On average, the golf ball 2 is hit at substantially normal temperature (25° C.). On the basis of a general time conversion rule of polyurethane, a deformation having a frequency of several thousand Hz in the environment having a temperature of 25° C. corresponds to a deformation having a frequency of 10 Hz in the environment having a temperature of 0° C. Thus, in the present invention, the shear loss elastic modulus G" and the tensile loss elastic modulus E" are measured under the conditions of a vibration frequency of 10 Hz and a temperature of 0° C.

A polyurethane and another resin may be used in combination for the cover 8. In this case, in light of spin performance and feel at impact, the polyurethane is included as the principal component of the base polymer. The proportion of the polyurethane to the entire base polymer is preferably equal to or greater than 50% by weight, more preferably equal to or greater than 70% by weight, and particularly preferably equal to or greater than 85% by weight.

For the cover 8, thermoplastic polyurethanes and thermosetting polyurethanes can be used. In light of productivity, thermoplastic polyurethanes are preferred. A thermoplastic polyurethane includes a polyurethane component as a hard segment, and a polyester component or a polyether component as a soft segment.

The polyurethane includes a polyol component. As the polyol, a polymeric polyol is preferred. Specific examples of polymeric polyols include polyether polyols such as polyoxyethylene glycol (PEG), polyoxypropylene glycol (PPG), and polytetramethylene ether glycol (PTMG); condensed polyester polyols such as polyethylene adipate (PEA), polybutylene adipate (PBA), and polyhexamethylene adipate (PHMA); lactone polyester polyols such as poly-E-caprolactone (PCL); polycarbonate polyols such as polyhexamethylene carbonate; and acrylic polyols. Two or more polyols may be used in combination.

Particularly, polytetramethylene ether glycol is preferred. The spin rate obtained when the golf ball 2 is hit with a short iron has a high correlation with the content of polytetramethylene ether glycol. Meanwhile, the spin rate obtained when the golf ball 2 is hit with a driver, a long iron, or a middle iron has a low correlation with the content of polytetramethylene ether glycol. The golf ball 2 including a polyurethane that includes polytetramethylene ether glycol in an appropriate amount has both excellent flight performance upon shots with a driver, a long iron, and a middle iron and excellent controllability upon a shot with a short iron.

In light of controllability, the polyol has a number average molecular weight of preferably 200 or greater, more preferably 400 or greater, and particularly preferably 650 or greater. In light of suppression of spin, the molecular weight is preferably equal to or less than 1500, more preferably equal to or less than 1200, and particularly preferably equal to or less than 850.

The number average molecular weight is measured by gel permeation chromatography. The measurement conditions are as follows.

Apparatus: HLC-8120GPC (manufactured by Tosoh Corporation)
Eluant: tetrahydrofuran
Concentration: 0.2% by weight
Temperature: 40° C.
Column: TSK gel Super HM-M (manufactured by Tosoh Corporation)
Sample volume: 5 microliters
Flow rate: 0.5 milliliter/min
Reference material: polystyrene ("PStQuick Kit-H" manufactured by Tosoh Corporation)

The polymeric polyol component has a hydroxyl value of preferably 94 mg KOH/g or greater and particularly preferably 112 mg KOH/g or greater. The hydroxyl value is preferably equal to or less than 561 mg KOH/g and particularly preferably equal to or less than 173 mg KOH/g.

Examples of an isocyanate component in the polyurethane include aromatic polyisocyanates such as 2,4-toluene diisocyanate, 2,6-toluene diisocyanate, a mixture (TDI) of 2,4-toluene diisocyanate and 2,6-toluene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylene diisocyanate (TMXDI), and paraphenylene diisocyanate (PPDI); alicyclic polyisocyanates such as 4,4'-dicyclohexylmethane diisocyanate ($H_{12}$MDI), hydrogenated xylylene diisocyanate ($H_6$XDI), and isophorone diisocyanate (IPDI); and aliphatic polyisocyanates such as hexamethylene diisocyanate (HDI). Two or more polyisocyanates may be used in combination. In light of weather resistance, TMXDI, XDI, HDI, $H_6$XDI, IPDI, and $H_{12}$MDI are preferred, and $H_{12}$MDI is particularly preferred.

The polyurethane may include a chain extender as its component. Examples of chain extenders include low-molecular-weight polyols and low-molecular-weight polyamines.

Examples of low-molecular-weight polyols include diols, triols, tetraols, and hexaols. Specific examples of diols include ethylene glycol, diethylene glycol, propanediol, dipropyleneglycol, butanediol, neopentylglycol, pentanediol, hexanediol, heptanediol, and octanediol. Specific examples of triols include glycerin, trimethylolpropane, and hexanetriol. Specific examples of tetraols include pentaerythritol and sorbitol. 1,4-butanediol is preferred.

Examples of low-molecular-weight polyamines include aliphatic polyamines, monocyclic aromatic polyamines, and polycyclicaromatic polyamines. Specific examples of aliphatic polyamines include ethylenediamine, propylenediamine, butylenediamine, and hexamethylenediamine. Specific examples of monocyclic aromatic polyamines include phenylenediamine, toluene diamine, dimethyl toluene diamine, dimethylthio toluene diamine, and xylylenediamine.

The chain extender has a number average molecular weight of preferably 30 or greater, more preferably 40 or greater, and particularly preferably 45 or greater. The molecular weight is preferably equal to or less than 400, more preferably equal to or less than 350, and particularly preferably equal to or less than 200. Low-molecular-weight polyols and low-molecular-weight polyamines that are used as chain extenders are low-molecular-weight compounds that almost do not have a molecular weight distribution. Thus, the low-molecular-weight polyols and the low-molecular-weight polyamines can be distinguished from the polymeric polyol.

The cover 8 may be formed from a composition including a thermoplastic polyurethane and an isocyanate compound. During or after forming the cover 8, the polyurethane is crosslinked with the isocyanate compound.

According to need, a coloring agent such as titanium dioxide, a filler such as barium sulfate, a dispersant, an antioxidant, an ultraviolet absorber, a light stabilizer, a fluorescent material, a fluorescent brightener, and the like are included in the cover 8 in an adequate amount.

The cover 8 has a JIS-C hardness Hc of preferably less than 65. The cover 8 is flexible. The flexible cover 8 can achieve excellent controllability upon a shot with a short iron. In light of controllability, the hardness Hc is preferably equal to or less than 60, more preferably equal to or less than 55, and particularly preferably equal to or less than 50. If the hardness Hc is excessively low, the flight performance upon a shot with a driver is insufficient. In this respect, the hardness Hc is preferably equal to or greater than 20, more preferably equal to or greater than 25, and particularly preferably equal to or greater than 35. For measuring the hardness Hc, a slab formed from a resin composition that is the same as the resin composition of the cover 8 is used. The measurement method is the same as the measurement method for the hardness Hm of the mid layer 6.

The hardness Hc of the cover 8 is less than the central hardness Ho of the center 10. The golf ball 2 has excellent controllability upon a shot with a short iron. In light of controllability, the difference (Ho−Hc) is preferably equal to or greater than 3, more preferably equal to or greater than 5, and particularly preferably equal to or greater than 8. The difference (Ho−Hc) is preferably equal to or less than 30.

In light of flight performance upon shots with a driver, a long iron, and a middle iron, the cover 8 has a thickness of preferably less than 0.8 mm, more preferably 0.6 mm or less, even more preferably 0.5 mm or less, and particularly preferably 0.4 mm or less. In light of controllability upon a shot with a short iron, the thickness is preferably equal to or greater than 0.10 mm and particularly preferably equal to or greater than 0.15 mm.

For forming the cover 8, known methods such as injection molding, compression molding, and the like can be used. When forming the cover 8, the dimples 14 are formed by pimples formed on the cavity face of a mold.

In light of feel at impact, the golf ball 2 has an amount of compressive deformation Dc of preferably 2.2 mm or greater, more preferably 2.3 mm or greater, and particularly preferably 2.4 mm or greater. In light of resilience performance, the amount of compressive deformation Dc is preferably equal to or less than 3.2 mm, more preferably equal to or less than 3.0 mm, and particularly preferably equal to or less than 2.8 mm.

The ratio (Do/Dc) of the amount of compressive deformation Do of the center 10 to the amount of compressive deformation Dc of the golf ball 2 is preferably equal to or greater than 1.8. When the golf ball 2 in which the ratio (Do/Dc) is equal to or greater than 1.8 is hit with a driver, a long iron, or a middle iron, spin can be suppressed. In this respect, the ratio (Do/Dc) is more preferably equal to or greater than 1.9 and particularly preferably equal to or greater than 2.0. In light of durability of the golf ball 2, the ratio (Do/Dc) is particularly preferably equal to or less than 2.8.

If the cover 8 is laminated directly on the mid layer 6, the cover 8 does not firmly adhere to the mid layer 6 due to the difference between the material of the cover 8 and the material of the mid layer 6. Preferably, the golf ball 2 includes an adhesive layer between the mid layer 6 and the cover 8. The adhesive layer firmly adheres to the mid layer 6 and also to the cover 8. The adhesive layer suppresses separation of the cover 8 from the mid layer 6. As described above, the cover 8 of the golf ball 2 is thin. When the golf ball 2 is hit by the edge of a clubface, a wrinkle is likely to occur. The adhesive layer suppresses occurrence of a wrinkle. In addition, the golf ball 2 is unlikely to break even by being repeatedly hit. In the golf ball 2, loss of energy transfer is small when the golf ball 2 is hit with a golf club. Thus, the golf ball 2 has excellent resilience performance.

The adhesive layer is formed by applying an adhesive to the surface of the mid layer 6 and drying the adhesive. The base polymer of the adhesive is a two-component curing type epoxy resin. A preferable two-component curing type epoxy resin is obtained by curing a bisphenol A type epoxy resin with a curing agent including a polyamine compound. The bisphenol A type epoxy resin is used for the two-component curing type epoxy resin, and thus the two-component curing type epoxy resin has excellent flexibility, chemical resistance, heat resistance, and toughness.

The adhesive is obtained by mixing a base material including a bisphenol A type epoxy resin and a solvent with a curing agent including a polyamine compound and a solvent. Examples of the solvents in the base material and the curing agent include organic solvents such as xylene and toluene and water.

Specific examples of the polyamine compound include polyamide amines and modified products thereof. A polyamide amine has a plurality of amino groups and one or more amide groups. The amino groups can react with epoxy groups. A polyamide amine can be obtained by a condensation reaction of a polymerized fatty acid and a polyamine. A typical polymerized fatty acid is obtained by heating and combining natural fatty acids including a large amount of unsaturated fatty acids, such as linoleic acid, linolenic acid, and the like, in the presence of a catalyst. Specific examples of unsaturated fatty acids include tall oil, soybean oil, linseed oil, and fish oil. A hydrogenated polymerized fatty acid having a dimer content of 90% by weight or greater and a trimer content of 10% by weight or less is preferred. Examples of preferable polyamines include polyethylene diamines, polyoxyalkylene diamines, and derivatives thereof.

EXAMPLES

Example 1

A rubber composition (2) was obtained by kneading 100 parts by weight of a high-cis polybutadiene (trade name "BR-730", manufactured by JSR Corporation), 28 parts by weight of methacrylic acid, 34.8 parts by weight of magnesium oxide, and 1.3 parts by weight of dicumyl peroxide. The rubber composition (2) was placed into a mold including upper and lower mold halves each having a hemispherical cavity, and heated at 170° C. for 15 minutes to obtain a center with a diameter of 15 mm.

A rubber composition (5) was obtained by kneading 100 parts by weight of a high-cis polybutadiene (the aforementioned "BR-730"), 33 parts by weight of zinc diacrylate, 5 parts by weight of zinc oxide, an appropriate amount of barium sulfate, 0.3 parts by weight of bis(pentabromophenyl) disulfide, and 0.9 parts by weight of dicumyl peroxide. Half shells were formed from the rubber composition (5). The center was covered with two half shells. The center and the half shells were placed into a mold including upper and lower mold halves each having a hemispherical cavity, and heated at 150° C. for 20 minutes to obtain a core with a diameter of 40.1 mm. An envelope layer was formed from the rubber composition (5). The amount of barium sulfate was adjusted such that the specific gravity of the envelope layer agrees with the specific gravity of the center and the weight of a golf ball is 45.4 g.

A resin composition was obtained by kneading 50 parts by weight of an ionomer resin (the aforementioned "Surlyn 8945") and 50 parts by weight of another ionomer resin (the aforementioned "Himilan AM7329") with a twin-screw kneading extruder. The core was placed into a mold including upper and lower mold halves each having a hemispherical cavity. The core was covered with the resin composition by injection molding to form a mid layer with a thickness of 1.0 mm.

An adhesive including a base material and a curing agent was prepared. The base material is a water-based epoxy composition manufactured by SHINTO PAINT CO., LTD. The base material includes 36 parts by weight of a bisphenol A type epoxy resin and 64 parts by weight of water. The epoxy equivalent of the base material is 1405 g/eq. The curing agent is a water-based amine composition manufactured by SHINTO PAINT CO., LTD. The curing agent includes 44 parts by weight of a modified polyamide amine, 50 parts by weight of water, 1 parts by weight of propylene glycol, and 5 parts by weight of titanium dioxide. The active hydrogen equivalent of the curing agent is 348 g/eq. This adhesive was applied to the surface of the mid layer with a spray gun and kept at 23° C. for 12 hours to obtain an adhesive layer with a thickness of 0.003 mm.

A resin composition (A) was obtained by kneading 100 parts by weight of polyurethane #1 and 4 parts by weight of titanium dioxide with a twin-screw kneading extruder. Half shells were obtained from the resin composition (A) by compression molding. The sphere consisting of the core, the mid layer, and the adhesive layer was covered with two of these half shells. The sphere and the half shells were placed into a final mold that includes upper and lower mold halves each having a hemispherical cavity and that has a large number of pimples on its cavity face. A cover was obtained by compression molding. The cover had a thickness of 0.3 mm. Dimples having a shape that was the inverted shape of the pimples were formed on the cover. A clear paint including a two-component curing type polyurethane as a base material was applied to this cover to obtain a golf ball of Example 1 with a diameter of 42.7 mm.

Examples 2 and 3 and Comparative Examples 1 to 3

Golf balls of Examples 2 and 3 and Comparative Examples 1 to 3 were obtained in the same manner as Example 1, except the specifications of the center, the envelope layer, and the cover were as shown in Tables 4 and 5 below. The rubber composition of the center is shown in detail in Table 1 below. The rubber composition of the envelope layer is shown in detail in Table 2 below. The resin composition of the cover is shown in detail in Table 3 below.

Comparative Example 8

A rubber composition (8) was obtained by kneading 100 parts by weight of a high-cis polybutadiene (the aforementioned "BR-730"), 38 parts by weight of zinc diacrylate, 5 parts by weight of zinc oxide, an appropriate amount of barium sulfate, 0.5 parts by weight of diphenyl disulfide, and 0.8 parts by weight of dicumyl peroxide. The rubber composition (8) was placed into a mold including upper and lower mold halves each having a hemispherical cavity, and heated at 170° C. for 20 minutes to obtain a core with a diameter of 40.1 mm. A mid layer that is the same as in Example 1 was formed on the core. An adhesive layer that is the same as in Example 1 was formed on the mid layer. A cover was formed from a resin composition (C) shown in Table 3 below, on the adhesive layer. A clear paint including a two-component curing type polyurethane as a base material was applied to this cover to obtain a golf ball of Comparative Example 8.

[Shot with Driver (W#1)]

A driver with a titanium head (trade name "SRIXON W505", manufactured by SRI Sports Limited, shaft hardness: X, loft angle: 8.5°) was attached to a swing machine manufactured by Golf Laboratories, Inc. A golf ball was hit under the condition of a head speed of 50 m/sec. The ball speed and the spin rate immediately after the hit and the distance from the launch point to the stop point were measured. The average value of data obtained by 12 measurements is shown in Tables 4 and 5 below.

[Shot with 5-Iron (I#5)]

A 5-iron (trade name "SRIXON Z-TX (steel shaft), manufactured by SRI Sports Limited) was attached to the swing machine. A golf ball was hit under the condition of a head speed of 41 m/sec. The ball speed and the spin rate immediately after the hit and the distance from the launch point to the stop point were measured. The average value of data obtained by 12 measurements is shown in Tables 4 and 5 below.

[Shot with Short Iron (SW)]

A sand wedge (trade name "CG15 Chrome Wedge", manufactured by SRI Sports Limited, loft angle:58°) was attached to the swing machine. A golf ball was hit under the condition of a head speed of 21 m/sec, and the spin rate was measured immediately after the hit. The average value of data obtained by 12 measurements is shown in Tables 4 and 5 below. In addition, water was applied to a clubface and a golf ball, and the golf ball was hit. The spin rate was measured immediately after the hit. The average value of data obtained by 12 measurements is shown in Tables 4 and 5 below.

[Feel at Impact]

Ten golf players hit golf balls with sand wedges, and were asked about feel at impact. The evaluation was categorized as follows on the basis of the number of golf players who answered, "the feel at impact was excellent".

A: 8 or more

B: 6 to 7

C: 4 to 5

D: 3 or less

The results are shown in Tables 4 and 5 below.

TABLE 1

Composition of Center

| Type | (1) | (2) | (3) | (4) |
|---|---|---|---|---|
| Polybutadiene | 100 | 100 | 100 | 100 |
| Zinc diacrylate | 30 | — | 22 | 18 |
| Methacrylic acid | — | 28 | — | — |
| Magnesium oxide | — | 34.8 | — | — |
| Zinc oxide | 5 | — | 5 | 5 |
| Barium sulfate | * | — | * | * |
| Diphenyl disulfide | 0.5 | — | 0.5 | 0.5 |
| Dicumyl peroxide | 0.6 | 1.3 | 0.7 | 0.7 |

* Appropriate amount

TABLE 2

Composition of Envelope Layer

| Type | (5) | (6) | (7) | (8) | (9) |
|---|---|---|---|---|---|
| Polybutadiene | 100 | 100 | 100 | 100 | 100 |
| Zinc diacrylate | 33 | 37 | 31 | 38 | 34 |
| Zinc oxide | 5 | 5 | 5 | 5 | 5 |
| Barium sulfate | * | * | * | * | * |
| Diphenyl disulfide | — | — | — | 0.5 | — |
| Bis(pentabromophenyl)disulfide | 0.3 | 0.3 | 0.3 | — | 0.3 |
| Dicumyl peroxide | 0.9 | 0.9 | 0.9 | 0.8 | 0.9 |

* Appropriate amount

TABLE 3

Composition of Cover

| Type | (A) | (B) | (C) |
|---|---|---|---|
| Polyurethane #1 | 100 | — | — |
| Polyurethane #2 | — | 100 | — |
| Polyurethane #3 | — | — | 100 |
| Titanium dioxide | 4 | 4 | 4 |
| Molecular weight of PTMG | 1500 | 1800 | 1800 |
| Elastic modulus E" ($\times 10^7$ Pa) | 3.51 | 3.24 | 3.68 |
| Elastic modulus G" ($\times 10^7$ Pa) | 1.42 | 2.77 | 2.92 |
| E"/G" | 2.47 | 1.17 | 1.26 |
| Hardness Hc (JIS-C) | 47 | 47 | 50 |
| Hardness (Shore D) | 32 | 32 | 34 |

The details of the polyurethanes in Table 3 are as follows.

Polyurethane #1
Trade name "Elastollan NY84A10 Clear", manufactured by BASF Japan Ltd.
Polyol component: polytetramethylene ether glycol Polyurethane #2
Trade name "Elastollan NY85A10 Clear", manufactured by BASF Japan Ltd.
Polyol component: polytetramethylene ether glycol Polyurethane #3
Trade name "Elastollan NY88A10 Clear", manufactured by BASF Japan Ltd.
Polyol component: polytetramethylene ether glycol

TABLE 4

Results of Evaluation

| | | Ex. 1 | Ex. 2 | Ex. 3 |
|---|---|---|---|---|
| Center | Composition | (2) | (3) | (4) |
| | Diameter (mm) | 15 | 15 | 18 |
| | Hardness Ho (JIS-C) | 68.0 | 63.9 | 55.7 |
| | Deformation Do (mm) | 4.99 | 5.39 | 6.45 |
| Envelope layer | Composition | (5) | (6) | (6) |
| | Hardness He (JIS-C) | 85.0 | 84.5 | 87.4 |
| Core | Diameter (mm) | 40.1 | 40.1 | 40.1 |
| | Volume ratio (%) | 82.8 | 82.8 | 82.8 |
| | He − Ho | 17.0 | 20.6 | 31.7 |
| | Deformation De (mm) | 2.75 | 2.65 | 2.78 |
| | Do/De | 1.81 | 2.03 | 2.32 |
| Mid layer | Hardness Hm (JIS-C) | 94 | 94 | 94 |
| | Thickness Tm (mm) | 1.0 | 1.0 | 1.0 |
| Sphere * | Deformation Dm (mm) | 2.42 | 2.44 | 2.53 |
| Cover | Composition | (A) | (A) | (A) |
| | Hardness Hc (JIS-C) | 47 | 47 | 47 |
| | Thickness Tc (mm) | 0.3 | 0.3 | 0.3 |
| Ball | Deformation Dc (mm) | 2.43 | 2.43 | 2.50 |
| | Do/Dc | 2.05 | 2.22 | 2.58 |
| W#1 | Spin (rpm) | 2266 | 2146 | 2096 |
| | Ball speed (m/s) | 73.8 | 73.7 | 73.6 |
| | Flight distance (m) | 285.2 | 285.5 | 285.8 |
| I#5 | Spin (rpm) | 4840 | 4845 | 4645 |
| | Flight distance (m) | 183.1 | 183.0 | 183.6 |
| SW | Dry spin (rpm) | 6581 | 6579 | 6551 |
| | Wet spin (rpm) | 5758 | 5759 | 5731 |
| Feel at impact | | A | A | B |

* Sphere consisting of core and mid layer

TABLE 5

Results of Evaluation

| | | Com. Ex. 1 | Com. Ex. 2 | Com. Ex. 3 | Com. Ex. 4 |
|---|---|---|---|---|---|
| Center | Composition | (1) | (3) | (4) | (8) |
| | Diameter (mm) | 15 | 15 | 18 | 40.1 |
| | Hardness Ho (JIS-C) | 68.0 | 63.9 | 55.7 | — |
| | Deformation Do (mm) | 4.25 | 5.39 | 6.45 | — |
| Envelope layer | Composition | (7) | (7) | (9) | — |
| | Hardness He (JIS-C) | 84.6 | 84.5 | 87.4 | — |
| Core | Diameter (mm) | 39.3 | 40.1 | 40.1 | 40.1 |
| | Volume ratio (%) | 78.0 | 82.8 | 82.8 | 82.8 |
| | He − Ho | 16.6 | 20.6 | 31.7 | — |
| | Deformation De (mm) | 2.90 | 3.30 | 2.50 | 2.31 |
| | Do/De | 1.46 | 1.63 | 2.58 | — |
| Mid layer | Hardness Hm (JIS-C) | 94 | 94 | 94 | 94 |
| | Thickness Tm (mm) | 1.4 | 1.0 | 1.0 | 1.0 |
| Sphere * | Deformation Dm (mm) | 2.33 | 3.10 | 2.25 | 2.20 |
| Cover | Composition | (B) | (B) | (A) | (C) |
| | Hardness Hc (JIS-C) | 47 | 47 | 47 | 50 |
| | Thickness Tc (mm) | 0.3 | 0.3 | 0.3 | 0.3 |
| Ball | Deformation Dc (mm) | 2.35 | 3.05 | 2.30 | 2.37 |
| | Do/Dc | 1.81 | 1.77 | 2.80 | — |
| W#1 | Spin (rpm) | 2230 | 2106 | 2170 | 2346 |
| | Ball speed (m/s) | 73.6 | 73.0 | 73.7 | 74.0 |
| | Flight distance (m) | 283.1 | 282.4 | 285.1 | 284.0 |
| I#5 | Spin (rpm) | 4810 | 4040 | 4880 | 5145 |
| | Flight distance (m) | 183.5 | 185.1 | 180.0 | 181.1 |
| SW | Dry spin (rpm) | 6490 | 6281 | 6430 | 6531 |
| | Wet spin (rpm) | 5280 | 5478 | 5620 | 5460 |
| Feel at impact | | C | C | C | B |

* Sphere consisting of core and mid layer

As shown in Tables 4 and 5, the golf ball according to Examples is excellent in various performance characteristics. From the results of evaluation, advantages of the present invention are clear.

The golf ball according to the present invention can be used for playing golf on golf courses and practicing at driving ranges. The above descriptions are merely for illustrative examples, and various modifications can be made without departing from the principles of the present invention.

What is claimed is:

1. A golf ball comprising a core, a mid layer positioned outside the core, and a cover positioned outside the mid layer, wherein
the core comprises a center and an envelope layer positioned outside the center,
a thickness of the envelope layer is equal to or greater than 8 mm but equal to or less than 18 mm,
a ratio (Do/De) of an amount of compressive deformation Do of the center when a load of 981 N is applied thereto, to an amount of compressive deformation De of the core when a load of 981 N is applied thereto, is equal to or greater than 1.5 but equal to or less than 2.5, and
a ratio (Do/Dc) of the amount of compressive deformation Do to an amount of compressive deformation Dc of the golf ball when a load of 981 N is applied thereto is equal to or greater than 1.8.

2. The golf ball according to claim 1, wherein the amount of compressive deformation Do is equal to or greater than 4.9 mm but equal to or less than 6.5 mm.

3. The golf ball according to claim 1, wherein the amount of compressive deformation De is equal to or greater than 2.4 mm but equal to or less than 2.9 mm.

4. The golf ball according to claim 1, an amount of compressive deformation Dm of a sphere consisting of the core and the mid layer is equal to or greater than 2.35 mm but equal to or less than 2.80 mm.

5. The golf ball according to claim 1, wherein a diameter of the center is equal to or less than 20 mm.

6. The golf ball according to claim 1, wherein a ratio of a volume of the core to a volume of a phantom sphere of the golf ball is equal to or greater than 78%.

7. The golf ball according to claim 1, wherein a difference (He−Ho) between a JIS-C hardness He at a surface of the core and a JIS-C hardness Ho at a central point of the center is equal to or less than 40.

8. The golf ball according to claim 1, wherein
a JIS-C hardness Hc of the cover is less than a JIS-C hardness Ho at a central point of the center, and
a difference (Ho−Hc) between the JIS-C hardness Ho and the JIS-C hardness Hc is equal to or greater than 3 but equal to or less than 30.

9. The golf ball according to claim 1, wherein a JIS-C hardness He at a surface of the core is equal to or greater than 75 but equal to or less than 95.

10. The golf ball according to claim 1, wherein a JIS-C hardness Ho at a central point of the center is equal to or greater than 40 but equal to or less than 80.

11. The golf ball according to claim 1, wherein
a JIS-C hardness Hm of the mid layer is equal to or greater than 90, and
a thickness of the mid layer is equal to or less than 1.5 mm.

12. The golf ball according to claim 1, wherein
a JIS-C hardness Hc of the cover is less than 65, and
a thickness Tc of the cover is less than 0.8 mm.

13. The golf ball according to claim 1, wherein
the cover is formed from a resin composition,
a shear loss elastic modulus $G''$ of the resin composition, which is measured under conditions of a vibration frequency of 10 Hz and a temperature of 0° C., is equal to or less than $1.95 \times 10^7$ Pa, and
a ratio ($E''/G''$) of a tensile loss elastic modulus $E''$ of the resin composition, which is measured under conditions of a vibration frequency of 10 Hz and a temperature of 0° C., to the shear loss elastic modulus $G''$ is equal to or greater than 1.76.

14. The golf ball according to claim 13, wherein the tensile loss elastic modulus $E''$ is equal to or greater than $2.00 \times 10^7$ Pa but equal to or less than $1.00 \times 10^8$ Pa.

15. The golf ball according to claim 1, wherein
the cover is formed from a resin composition, and
a principal component of a base material of the resin composition is a thermoplastic polyurethane.

16. The golf ball according to claim 15, wherein a polyol component of the thermoplastic polyurethane is polytetramethylene ether glycol having a number average molecular weight of 1500 or less.

17. The golf ball according to claim 15, wherein an isocyanate component of the thermoplastic polyurethane is 4,4'-dicyclohexylmethane diisocyanate.

* * * * *